(12) United States Patent
Eder et al.

(10) Patent No.: US 6,885,858 B2
(45) Date of Patent: Apr. 26, 2005

(54) SYSTEM AND METHOD FOR OPERATING A BILLING SYSTEM, AND BILLING SYSTEM

(75) Inventors: Reinhard Eder, Siegertsbrunn (AT); Ronald Heine, Fredersdorf (DE); Friedrich Koch, München (DE)

(73) Assignee: Siemens Aktiengesellschaft, Munich (DE)

( * ) Notice: Subject to any disclaimer, the term of this patent is extended or adjusted under 35 U.S.C. 154(b) by 280 days.

(21) Appl. No.: 10/348,320

(22) Filed: Jan. 22, 2003

(65) Prior Publication Data

US 2003/0153298 A1 Aug. 14, 2003

(30) Foreign Application Priority Data

Jan. 23, 2002 (EP) .............................................. 02001619

(51) Int. Cl.[7] ...................... H04M 11/00; H04M 15/00; H04Q 7/20
(52) U.S. Cl. .................... 455/406; 455/408; 455/432.3; 455/433; 379/114.2; 379/221.09; 379/222
(58) Field of Search ................................ 455/405–408, 455/424, 432.3, 433, 554.1; 379/114.2, 121.01, 201.02, 221.08, 221.09, 222, 229–230

(56) References Cited

U.S. PATENT DOCUMENTS 6,023,502 A 2/2000 Bouanaka et al. .......... 379/115

6,801,781 B1 * 10/2004 Provost et al. .............. 455/466
2004/0017905 A1 * 1/2004 Warrier et al. .......... 379/114.15

FOREIGN PATENT DOCUMENTS

EP 1 077 436 A2 2/2001 ........... G07F/19/00

OTHER PUBLICATIONS

XP004186946: "Charging for packet–switched network communication–motivation and overview" by M. Karsten, et al., c. 2000.

* cited by examiner

Primary Examiner—Binh Tieu
(74) Attorney, Agent, or Firm—Morrison Foerster

(57) ABSTRACT

The invention relates to a method for operating a billing system for billing for services provided by a service provider and/or for transmissions of service data via a terminal used by a subscriber using a communication network, where the service provider is arranged outside the communication network, and the billing system accesses subscriber profile data stored in a home location register in the communication network. Access to the subscriber profile data is followed by use thereof to ascertain the TCP/IP address of an account server which manages an electronic credit belonging to the subscriber. The invention also shows a billing system for carrying out the method.

8 Claims, 1 Drawing Sheet

US 6,885,858 B2

SYSTEM AND METHOD FOR OPERATING A BILLING SYSTEM, AND BILLING SYSTEM

CLAIM FOR PRIORITY

This application claims priority to Application No. 02001619.2 which was filed in the German language on Jan. 23, 2002.

TECHNICAL FIELD OF THE INVENTION

The invention relates to a system and method for operating a billing system.

BACKGROUND OF THE INVENTION

Service providers provide telecommunications services to service users whose terminals are connected to the service providers via a communication network. Normally, a use charge and a transmission charge are required in order to use a telecom service and to transmit service data, as is necessary for this purpose. To regulate the payment cycles between the service provider and the service user, the service providers which regulate the payment process, namely payment service providers (PSP), access a credit account (prepaid account) belonging to the service user and debit the use and transmission charges incurred for use of the service. Alternatively, the PSP can issue an invoice for the use charges and transmission charges which have been incurred, in a postpaid mode.

Services provided for which a charge is to be levied can be, by way of example, the calling of WAP pages, the downloading of data from the Internet and/or payment (micropayment) using the mobile terminal.

In mobile radio networks, a home location register (HLR) stores, for each subscriber, data which provide, inter alia, information about which network services this subscriber uses. Some of these services stipulate the circumstances under which the services of the intelligent network (IN) are to be started with the subscriber for support by the CAMEL protocols (CAMEL=Customer Applications for Mobile Enhanced Logic).

An intelligent network is formed by extending an existing telephone network. New, "intelligent" network nodes and special network components and also additional functions for extending existing exchanges are introduced into the network. The architecture of the intelligent network is obtained essentially from the operation of a service switching point (SSP), which is introduced as an extension of existing digital local or trunk exchanges, and of service control points (SCP) used as "intelligent" network nodes for setting up connections within the context of IN services.

The CAMEL concept was developed in connection with IN/GSM integration. CAMEL is a platform created for this purpose by the European Telecommunication Standardization Institute (ETSI) which introduces the fundamental concept of intelligent networks (IN) in the GSM mobile radio system. CAMEL should allow the GSM subscribers to use the same services as in the home mobile radio network (Home Public Land Mobile Network, HPLMN) even when they are roaming throughout the world.

The portion of the services which stipulates how and what services of the intelligent network are used by the subscriber is called CAMEL Subscription Indication (CSI) and exists in various forms, such as O-CSI, D-CSI, T-CSI, among others. The services are, by way of example, preferential tariffs, flexible allocation of call charges, conference calls, set up of virtual private networks (VPN) and closed user groups, call-free call numbers (0800) and personal call numbers.

The CSI data also store various further information giving more detailed information about handling the associated IN services. An example which may be mentioned in this context is the charging method, i.e. whether a subscriber's charges are settled using a prepaid method or a postpaid method. If the accounts from which the charges for the services used are to be debited are managed using IN solutions, addressing problems may arise, particularly if the accounts are distributed over a plurality of SCPs.

SUMMARY OF THE INVENTION

The present invention provides a system and method for operating a billing system which forwards the charges for a service used to the correct SCP managing the account which is to be debited.

In one embodiment of the invention, there is a method for operating a billing system involves accessing subscriber profile data stored in a home location register in the communication network. In this case, the method is used to bill for services and/or transmissions of service data provided by a service provider arranged outside a communication network. The subscriber requests these services via a terminal using the communication network. Following access to the subscriber profile data in the home location register, the billing system uses the subscriber profile data to ascertain the Internet address or TCP/IP address of an account server or SCP which manages an electronic credit belonging to the subscriber. Access to the address information in the home location register in the communication network eliminates the need for duplicate data storage firstly for the communication network and secondly for linking external service providers.

In another preferred embodiment, a use charge and a transmission charge are ascertained, are added together to give a total charge and on the basis of the subscriber profile data debiting if the total charge from an electronic credit belonging to the subscriber is initiated. Alternatively, an invoice for subsequent charging can be issued in a postpaid mode. This provides the subscriber with the information regarding the total charges incurred for his use of services.

In another preferred embodiment of the invention, the total charge is ascertained before use of a service and/or transmission of the service data. This ensures that transmission of service data is not terminated on account of insufficiently covered electronic credit for the transmission charge incurred. Instead, the billing system is used to perform a check for sufficient credit coverage before the service is actually used, so that payment both of the use charge and of the transmission charge is ensured.

In still another embodiment of the invention, the home location register is accessed by converting a subscriber profile check from TCP/IP to SS7/MAP. The SS7 protocol from ITU-T (Q.700) is suitable for the signaling between network nodes and exchanges (inter exchange signaling) for all kinds of digital communication services, for example narrowband and broadband voice and data services. It forms the basis for adding and implementing IN functions, in a similar way to the bottom layers of the OSI reference model (the physical connection and network level). On the application level, the ISDN User Part (ISUP), the Telephony User Part (TUP) and the Mobile Application Part (MAP) are distinguished for signaling in the ISDN-like telephone or mobile radio network.

The subscriber profile data obtained from the home location register are likewise converted from SS7/MAP to TCP/

IP. This allows the data managed using SS7/MAP in the home location register to be used by the application linked via the Internet.

Preferably, the subscriber profile data in the home location register are accessed on the basis of the CAMEL standard. CAMEL is the platform provided for this purpose which introduces the fundamental concept of intelligent networks (IN) into the GSM mobile radio system. With particular preference, the subscriber profile data in the home location register are accessed using a message Anytime Subscriber Information (ATSI) which is standardized in the CAMEL standard in phase 3.

In one aspect, the billing system is obtained in line with the above description of the advantageous aspects of the inventive method.

BRIEF DESCRIPTION OF THE DRAWINGS

Advantages and expediencies can be found in the description below of the exemplary embodiment in conjunction with the drawing.

DETAILED DESCRIPTION OF THE INVENTION

Figure 1:
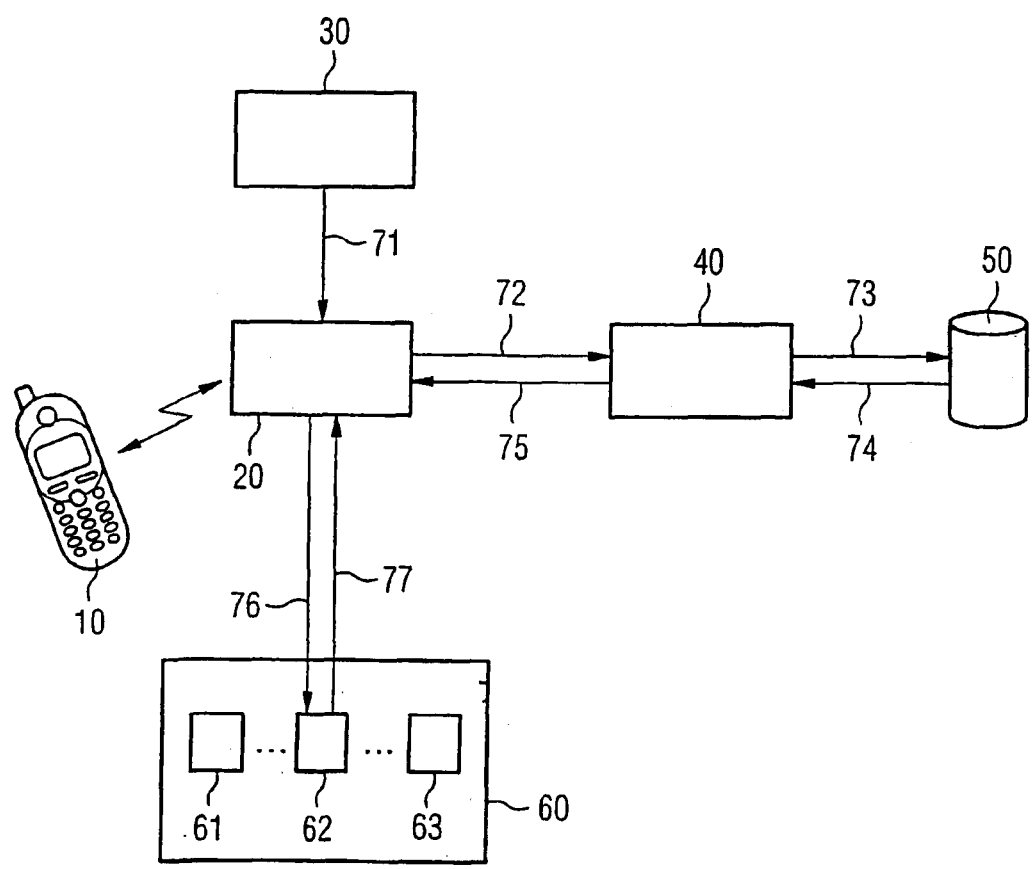
FIG. 1 shows a billing system according to one embodiment of the invention.

FIG. 1 shows a billing system having a terminal 10, an application server 20 and an external server 30 belonging to a service provider. The application server 20 is connected to an address resolution server (ARS) 40 which represents a specific SCP in the intelligent network. The address resolution server 40 accesses the information or subscriber profile data stored in the HLR 50.

In addition, the application server 20 is connected to a prepaid platform 60. The prepaid platform 60, for its part, comprises a plurality of SCPs 61, 62, 63. In this case, each of these SCPs 61, 62, 63 can manage electronic credits for subscribers in the mobile radio network.

The text below will describe, by way of example, the downloading from the Internet of data which are subjected to a charge. When the subscriber has selected the data and has requested that it be downloaded, the server 30 belonging to a service provider first asks the application server 20 to debit a charge on the basis of this requested service. This request is transmitted via the Internet using TCP/IP and the message Charge_request 71.

On the basis of the data obtained for the subscriber (MSISDN=Mobile Subscriber ISDN), the application server 20 sends an address check to the address resolution server 40. In this context, MSISDN is understood to be a technical name for the number of the subscriber in the mobile radio network. The two servers 20 and 40 communicate by means of TCP/IP, and the address check is made in the message ADDR_request 72.

The ARS 40 converts the query parameters received by means of TCP/IP and starts—as is usual in mobile radio networks—an information check to the HLR 50 using SS7/MAP. This involves the ARS 40 using the information MSISDN transmitted to it to ascertain the HLR 50 in which the necessary subscriber profile data are stored. The check is made using the message AnyTimeSubscriberInformation ATSI 73 standardized in CAMEL phase 3. Alternatively, this message can also be replaced by an extension of the message ATI available since CAMEL phase 1.

The HLR 50 returns the requested subscriber profile data to the ARS 40 using the message ATSI_ack 74. Using the subscriber profile data received, the ARS 40 ascertains whether a subscriber whose charges are paid using the prepaid method is involved. In this case, the ARS 40 ascertains the TCP/IP address of the IN platform or of the SCP on which the corresponding prepaid account including an electronic credit is managed.

The ARS 40 converts the corresponding subscriber profile data to TCP/IP and forwards them to the application server 20 using the message ADDR_response 75. If the checks revealed a subscriber profile in which charges incurred are paid using a postpaid method, the application server 20 issues a settlement ticket. This is processed in a post processing process by the mobile radio operator.

If the requested subscriber profile data involve a prepaid subscriber, the application server 20 sends a debit request CHRG_request 76 to the appropriate SCP which manages the electronic credit account. Following successful debiting from the electronic account, the SCP 62 sends a debit acknowledgement CHRG_response 77 to the application server 20.

In the specific case of downloading data from the Internet subject to a charge, the data are then made available or sent to the subscriber following payment.

In the same way, the inventive billing method and system can be used for cashless payment methods using a mobile terminal. In this case, payment is regarded as having been made when the debit acknowledgement has been issued, and the subscriber can receive the requested service and/or the product which is to be paid for.

At this juncture, it should be pointed out that all the parts described above are claimed as being fundamental to the invention independently and in any combination, particularly the details shown in the drawing. Modifications thereto are familiar to a person skilled in the art.

What is claimed is:

1. A method for operating a billing system to bill services provided by a service provider and/or for transmissions of service data via a terminal used by a subscriber using a communication network, comprising:

providing a service provider arranged outside the communication network; and accessing subscriber profile data stored in a home location register in the communication network, via the billing system, wherein access to the subscriber profile data in the home location register is followed by use of the subscriber profile data to ascertain the IP address of an account server which manages an electronic credit belonging to the subscriber.

2. The method as claimed in claim 1, wherein the billing system ascertains a use charge and a transmission charge, adds the charges together to give a total charge and, on the basis of the subscriber profile data, initiates debiting of the total charge from an electronic credit belonging to the subscriber or initiates invoicing for subsequent charging.

3. The method as claimed in claim 2, wherein the billing system ascertains the total charge before use of a service and/or transmission of the service data.

4. The method as claimed in claim 1, wherein the home location register is accessed by converting a subscriber profile check from TCP/IP to SS7/MAP and converting the subscriber profile data obtained from the home location register from SS7/MAP to TCP/IP.

5. The method as claimed in claim 1, wherein the subscriber profile data in the home location register are accessed on the basis of the CAMEL standard.

6. The method as claimed claim 1, wherein the subscriber profile data in the home location register are accessed using a message Anytime Subscriber Information which is standardized in the CAMEL standard in phase 3.

7. A billing system, comprising:
   a communication network having at least one terminal and at least one account server which manages an electronic credit belonging to a subscriber; and
   a server belonging to a service provider which is connected to the communication network and has services used by the terminal, wherein
   the communication network has a home location register with subscriber profile data stored thereon which are accessed by the billing system, and
   the billing system includes a server function which, following access to the subscriber profile data in the home location register, uses the subscriber profile data to ascertain the TCP/IP address of the account server.

8. The billing system as claimed in claim 7, further comprising:
   an application server which receives a charge request by means of a TCP/IP connection from a server belonging to a service provider on account of use of a service by a subscriber and forwards a subscriber check on the basis thereof; and
   an address resolution server which is configured to use a TCP/IP connection to communicate with the application server and converts the subscriber checks or subscriber profile data between different protocols for forwarding purposes, wherein
   the home location register communicates with the address resolution server using an SS7/MAP connection, and
   the account server uses a TCP/IP connection to communicate with the application server and manages an electronic credit.

* * * * *